Patented Apr. 14, 1925.

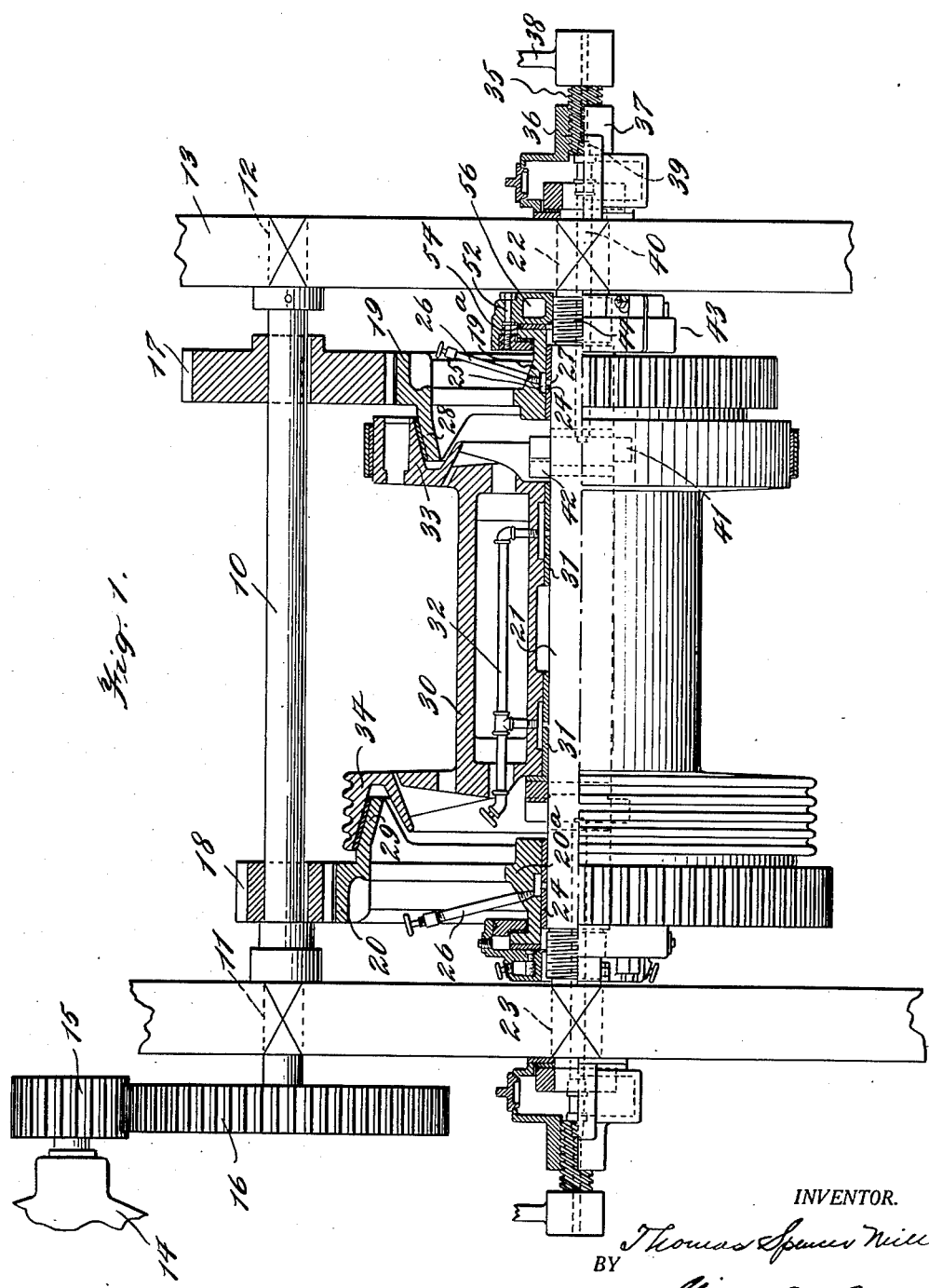

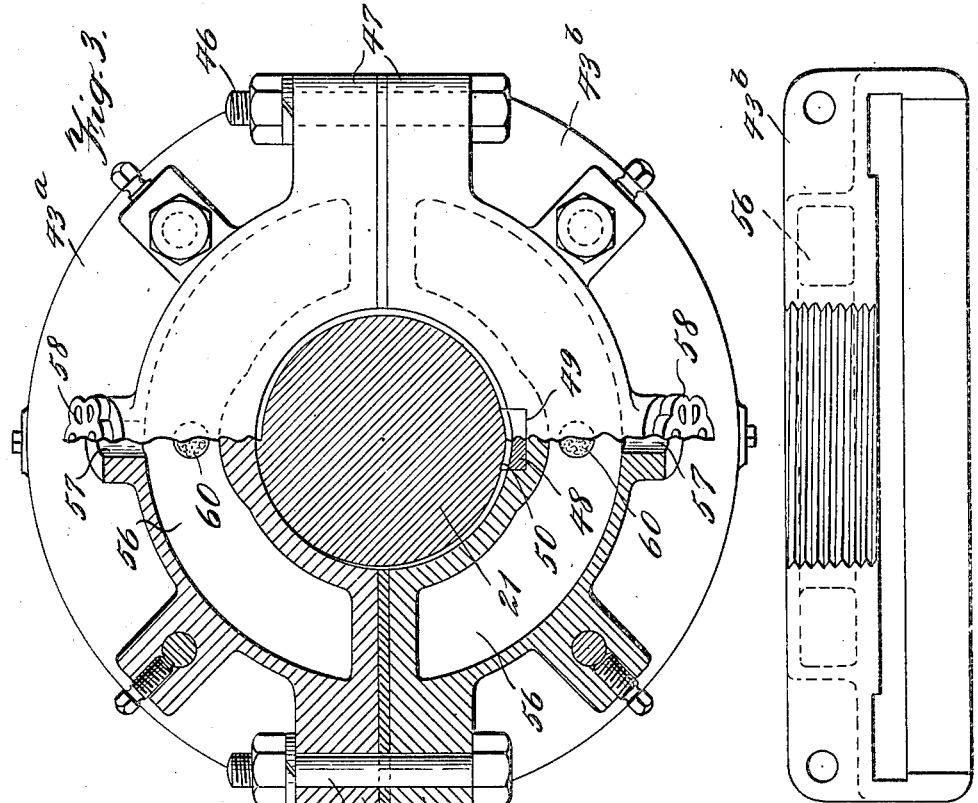
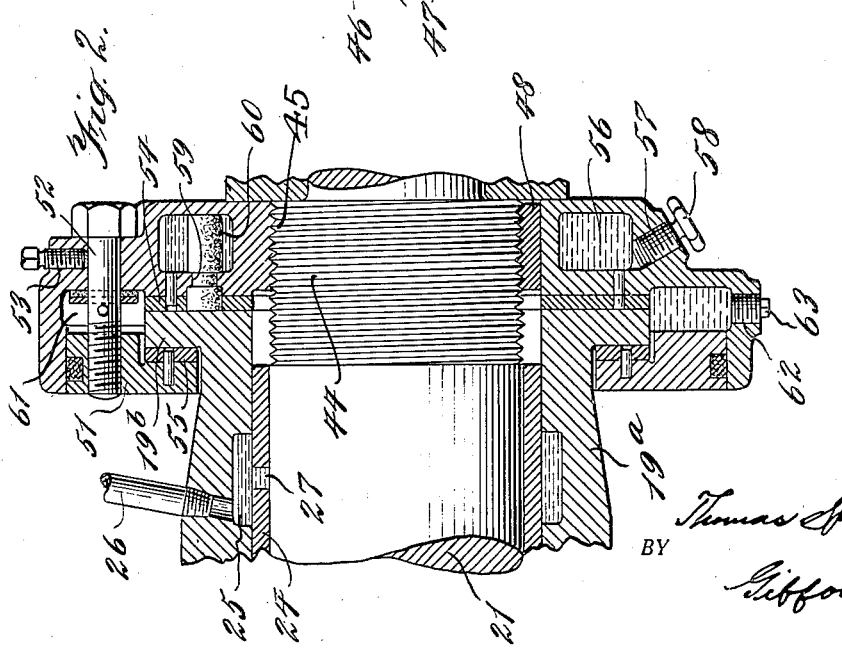

1,533,201

UNITED STATES PATENT OFFICE.

THOMAS SPENCER MILLER, OF SOUTH ORANGE, NEW JERSEY.

TWO-SPEED HOISTING MECHANISM.

Application filed July 7, 1922. Serial No. 573,497.

*To all whom it may concern:*

Be it known that I, THOMAS SPENCER MILLER, a citizen of the United States, and a resident of South Orange, in the county of Essex and State of New Jersey, have invented certain new and useful Improvements in Two-Speed Hoisting Mechanism, of which the following is a specification.

My invention consists of certain novel parts and combination of parts, particularly pointed out in the claims.

The following is a description of a mechanism embodying my invention, in the form at present preferred by me, but it will be understood that various modifications and changes may be made therein without departing from the spirit of my invention and without exceeding the scope of my claims.

My invention will best be understood by reference to the accompanying drawings, in which Figure 1 is a longitudinal sectional view, partially in elevation, through a device embodying my invention; Fig. 2 is a sectional view particularly illustrating one of the stop or thrust-receiving members secured on the shaft; Fig. 3 is an end view, partially in section, of Fig. 2, and Fig. 4 is a plan view of the lower half of the stop-collar of Fig. 3.

Like reference characters indicate like parts through the drawings.

Referring, now, to the drawings, 10 is a driving shaft having its bearings at 11 and 12 in the frame 13 of the machine. The shaft 10 may be driven in any suitable manner, as by an electric motor 14, through gears 15 and 16 secured on the shaft of the motor and the driving shaft 10, respectively. In the form shown, two gears, 17 and 18, of different diameters are secured to the shaft and mesh with gears 19 and 20, constituting driving members, loosely mounted on a shaft 21 having its bearings at 22 and 23 in the frame 13. Bearing members or sleeves 24 are preferably interposed between the hubs 19ª and 20ª of the gears 19 and 20 and the shaft 21, the inner face of each of the hubs 19ª and 20ª preferably being provided with a lubricating groove 25, into which lubricating material may be introduced through suitable oil-cups or pipes 26, the bearing members 24 being provided with openings 27 through which the oil may pass from the groove 25 to the bearing surface between the bearing member 24 and the shaft. Ordinarily the driving shaft 10 is rotated continuously, though not necessarily so, and the gears 19 and 20 are rotated at different speeds. The inner side of each of the gears 19 and 20 is provided with friction members 28 and 29, respectively, preferably in the form of friction cones.

Between the two driving members 19 and 20 is located a driven member 30, which is here shown as a drum, but which obviously may be any other character of driven member, such as a pulley, gear, etc. The driven member 30 is preferably loosely mounted on the shaft 21 and is longitudinally movable thereof. Suitable bearing members 31 are preferably interposed between the driven member 30 and the shaft 21, the bearing surfaces preferably being lubricated by means of an oil pipe 32, which need not be specifically described. The driven member 30 is provided with hollow cones 33 and 34, which are adapted to engage the cone members 28 and 29 of the respective gears when the drum or driven member is forced to the right or to the left, it being understood that when the drum is forced to the right, as viewed in Fig. 1, it will be driven with relatively low power and high speed, and when it is forced to the left, will be driven at relatively high power and low speed.

The mechanism for thrusting or forcing the driven member 30 to the right or to the left to bring the drum into operative engagement with the respective driven members is the same at each end of the device illustrated in Fig. 1, and I will, accordingly, describe but one of these thrust mechanisms. This mechanism comprises a screw 35, the threaded portion of which is received in a screw-threaded opening 36 in a part 37 of the frame; so that rotary movement of the screw, as by the handle 38, produces longitudinal movement thereof. The inner end of the screw 35 engages the outer end 39 of a thrust pin 40, which is received in an opening extending axially of the shaft in a manner well understood in the art. The inner end of the pin 40, as illustrated in dotted lines in Fig. 1, engages a key 41 which extends through a slot in the shaft 21 in a well understood manner, the key, in turn, engaging a friction disc 42, which, in turn, engages the right-hand end of the drum 30, the friction disc 42 preferably being formed of a material different from that of which the drum is formed.

Located on the side of the gear or driving member 19 opposite from the drum or driven member is a stop member or collar, which I have indicated, generally, at 43, and which is adjustably secured to the shaft. The portion of the shaft which is engaged by the collar 43 is preferably screw-threaded, as at 44, and the inner face of the collar 43 is correspondingly screw-threaded, as at 45. The collar 43 is of the split type and comprises the parts 43$^a$ and 43$^b$, which are similar in construction, the two parts being clamped together and upon the screw-threaded part of the axle 21 by clamping bolts 46 passing through openings in lugs 47 formed on the respective halves 43$^a$ and 43$^b$ of the collar. The clamping action of the collar 43 on the shaft 21 is assisted by a threaded key 48, which may be received in a recess 49 on the inner face of one of the parts 43$^b$ of the collar, the key being threaded, as at 50, on its inner face, which engages the threaded portion 44 of the shaft, the concave face of the key 48 preferably having a less radius than that of the shaft, so that when the two parts of the collar are clamped together, the edges of the key 48 will slightly bite into the shaft. The outer end of the hub 19$^a$ is preferably provided with a radially extending flange 19$^b$, which is engaged by an overhanging lip or flange 51, the same being formed in two parts, corresponding to the two parts of the clamping collar and secured thereto by clamping bolts 52, the clamping bolts preferably being retained in position by set-screws 53. Suitable friction discs 54 and 55 are located between the end of the hub 19$^a$ of the gear and the collar 43 and between the flange 19$^b$ and the overhanging flange 51, respectively. I have provided a collar or thrust resisting member secured to the shaft and having two bearing surfaces at right angles to the shaft, which engage bearing surfaces of the driving member, the bearing surfaces of one of the members facing each other and engaging on opposite sides of the bearing surfaces of the other member. Such an arrangement provides an effective and ready means for adjustably securing the thrust resisting member longitudinally of the shaft, in order to compensate for wear between the bearing surfaces of the gear and the drum. Furthermore, by making the bearing surfaces which face each other adjustable, the wear between the bearing surfaces of the two members is readily compensated for.

In order to provide for the lubrication of the bearings, each half, 43$^a$ and 43$^b$, of the collar is provided with a segmental chamber, as at 56, into which lubricating material may be introduced through a tapped opening 57, which may be closed by a plug 58. The inner wall of each half of the collar is provided with an opening 59 leading from the chamber 56 to the bearing between the end of the hub 19$^a$ and the stop-collar, the lubricating material being carried to the bearing surface by a wick 60 formed of fibrous material, such as felt, and which carries the lubricating material by capillary attraction. The wicks 60 are preferably arranged at different distances from the center, so as to provide a more even distribution of the lubricating material on the bearing surfaces. A second chamber 61 is preferably provided in each of the collars between the main part of the collar and the overhanging flange or lip 51, the inner side of the chamber being closed by the outer face of the flange 19$^b$. Lubricating material may be introduced to the chamber 61 by an opening 62, which may be closed by a plug 63.

The operation of the device embodying my invention will readily be understood from the foregoing description, and is as follows: Assume that it is desired to rotate the driven member or drum 30 at relatively high power and low speed. The screw 38 will be rotated in a direction to move the same to the left, it being understood that the corresponding screw at the opposite end of the device will be moved in a direction to move it to the left. The inner end of the screw engaging the thrust pin 41 moves the latter to the left, as viewed in Fig. 1; and, in turn, the key 41 and the collar 42, which, in turn, thrusts the driven member 30 to the left into engagement with the cone 29 on the gear-wheel 20, movement of the gear-wheel to the left being resisted by the split collar secured to the shaft at the left thereof. The drum will thereby be rotated at relatively high power and low speed. It will readily be understood that the drum will be moved in the reverse direction to rotate at low power and high speed by the reverse movement of the screws 35.

The friction between the gears and the stop-collars will ordinarily be greater than the friction of the shaft in its journal-bearing; so that the shaft will ordinarily revolve, thereby preventing irregular wear on the same.

The wear at the outer end of the hub of either gear is taken up by slightly unclamping the bolts 46 on the collar 43 on the corresponding end of the device, turning the collar on the screw-threads on the shaft until it is properly adjusted, and then clamping the same in position. The wear between the overhanging flange or lip 51 of the collar and the flange 19$^b$ of the hub is taken up by rotating the bolts 52.

With the described construction, it will be apparent that where the stop members or collars 43 are located on the sides of the driving members or gears opposite from the driven member 30, they are in a position where they are readily accessible for adjustment. In operation, the lubricating material flows from the chambers 56 through the wicks to the bearing surfaces, from which it may find its way to the second chamber 61. Furthermore, the lubricating material in the chamber 61, when the latter is in the uppermost position, flows to the bearings between the flange 19$^b$ and the stop-collar, and between the flange 19$^b$ and the overhanging flange or lip 51, so that the bearings are thoroughly lubricated.

In a hoisting apparatus of the kind illustrated, the friction surfaces 28 and 29 wear in use and there must be compensation for this wear. Since in a two-speed device, the drum 30 must be moved into operative relation with a friction surface at either end thereof, it is obvious that such wear of the surface of the cone 28, for instance, cannot be compensated by moving the drum 30 and its cone 33 further to the right of Fig. 1 by shifting the position of the screw 35 and its handle 38, as would be done if only a single speed was provided, because such adjustment would throw the friction surface of the cone 29 out of proper relation with the friction surface of the cone 34. I overcome this difficulty by providing the adjustable stop-collars 43 at either end of the shaft. When, for instance, the cones 28 and 33 need adjustment, the stop-collar 43 at the right of Fig. 1 is moved to bring the gear 19 with its cone 28 in proper cooperation and this obviously will not disturb the relation of the cone 34 to the cone 29. A similar adjustment may be made of the collar 43 at the left of Fig. 1 when cones 29 and 34 need relative adjustment. Thus, I have provided a two-speed hoist which can be maintained in proper adjustment for both speeds without the adjustments for one speed interfering with the adjustments for the other speed.

Similarly, by providing the adjustment for the overhanging lip 51, and particularly by mounting it on the adjustable collar 43, the adjustment of the collar 43 does not disturb the relation of the flange 19$^b$ with the flange 51. On the other hand, wear between these parts may be taken up by the bolts 52 without disturbing the adjustment of the collar 43.

It will be obvious that the embodiment of my invention may be widely varied and that the arrangement shown is merely illustrative.

What I claim and desire to secure by Letters Patent of the United States is:

1. In combination, a shaft, driven means mounted thereon and longitudinally movable thereof, a driving member loosely mounted on said shaft for driving said driven means, means for moving said driven means longitudinally of the shaft into engagement with said driving member, said driving member having a portion provided with two annular bearing surfaces at right angles to the axis of the shaft, and a member secured to the shaft but adjustable longitudinally thereof and provided with annular bearing surfaces engaging those of the driving member, the pair of bearing surfaces of one of said members facing each other and engaging therebetween the bearing surfaces of the other member, whereby movement of said driving member in either direction is prevented, and means for adjustably spacing the pair of bearing surfaces which face each other.

2. In combination, a shaft, a driven member mounted thereon and longitudinally movable thereof, a driving member loosely mounted on said shaft for driving said driven member, means for moving said driven member longitudinally of the shaft into engagement with said driving member, said driving member being provided with an outwardly extending flange, and a clamping collar adapted to be adjustably secured to said shaft and provided with an overhanging lip adapted to engage said flange whereby said driving member is prevented from moving longitudinally of said shaft in either direction, said overhanging lip being adjustably secured to said collar.

3. In a two-speed hoist, a shaft, a hoisting drum thereon, driving members loosely mounted on the shaft and located at opposite ends of said drum, means for turning said driving members at different speeds, means for moving said drum longitudinally of the shaft into driving engagement with either of said driving members, at the will of the operator, and split collars adjustably secured to said shaft and arranged to prevent longitudinal motion of the driving members away from the drum, each of said split collars being located on the side of its driving member opposite that in contact with the drum, and each of said collars being provided with an overhanging lip adapted to engage a flange on the driving member to prevent motion of said driving member away from the split collar, and means to adjust the relation of said overhanging lip and said flange.

THOMAS SPENCER MILLER.